United States Patent Office 3,447,128
Patented May 27, 1969

3,447,128
AIRCRAFT GLIDE PATH VISUAL POSITION-INDICATING DEVICE
Henry Patrick Birmingham and Barbour L. Perry, Alexandria, Va., and Alan W. Baldwin, Oxon Hill, Md., assignors to the United States of America as represented by the Secretary of the Navy
Filed Jan. 12, 1966, Ser. No. 520,189
Int. Cl. G08g 5/02
U.S. Cl. 340—26                                    3 Claims

ABSTRACT OF THE DISCLOSURE

The invention provides a visual position-indicating device, which is in situ near the landing point for aircraft to aid a pilot of the aircraft in following a desired glide path to a successful landing. The device consists of a shadow box having a number of spaced thin-filament light sources and a corresponding number of slits in the wall opposite these light sources. This arrangement provides a source of light which appears to move vertically to a pilot as his craft moves vertically in the glide plate.

---

Figure 1:
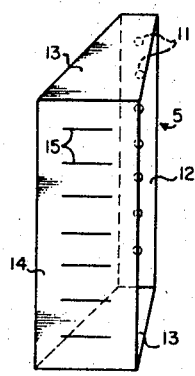

The present invention relates generally to improvements in visual position-indicating devices, which are located near the landing point for an aircraft, and more particularly to a new and improved device for providing the pilot of an aircraft with a visual display of the aircraft's position with respect to the desired glide path in an approach to a landing on the ground or on the deck of an aircraft carrier. This device is to be located near the landing or touch-down point for the aircraft, either on the ground or on the deck of an aircraft carrier.

In the field of visual position-indicating landing aids it has been the practice to employ lens systems, e.g. the Fresnel Lens Optical Landing System (FLOLS), to aid the pilots of aircraft in following the desired glide path to a successful landing. Although such devices have served the purpose they have not proved entirely satisfactory under all conditions of service for the reasons that they require the use of sophisticated and costly lens systems which in turn require elaborate and accurate temperature controlling systems in order that the lenses, which are plastic, will not expand or contract so as to change their optical characteristics. The Fresnel Lens Systems are also extremely costly to maintain.

The general purpose of this invention is to provide a visual position-indicating device which embraces all the advantages of similarly employed devices and systems and possesses none of the aforedescribed disadvantages. To attain this the present invention contemplates the use of a shadowbox device having a number of spaced thin-filament light sources and a corresponding number of slits or slots in the wall or slot plate opposite these light sources. This device provides a means for obtaining a visual display which has the same optical characteristics as do the FLOLS and related systems, while decreasing the number of components essential to the operation of these prior art systems. This decrease in the number of components results in a simple, low-cost display device. Although this invention provides for a reduction in the number of components essential in prior art display devices, no adverse effects are produced as a result of the new arrangement.

An object of the present invention is the provision of a visual position-indicating device for displaying a desired glide path to the pilot of an aircraft.

Another object is to provide a device of the above description which is less complex and less costly to produce and maintain than previous visual position-indicating devices.

A further object of the invention is the provision of a visual position-indicating device which attains the same results with fewer components than previous devices of this type, and which produces no adverse effects as a consequence of the new arrangement.

Figure 2:
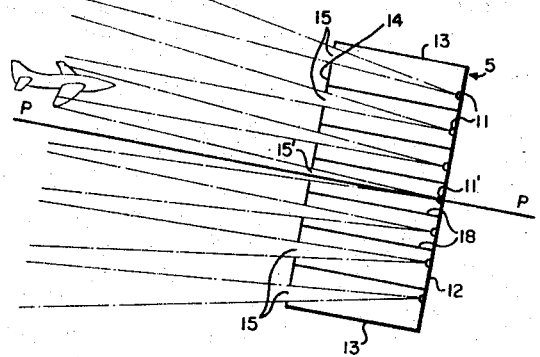
Figure 2A:
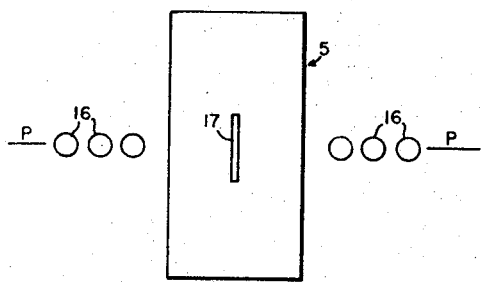
Figure 2B:
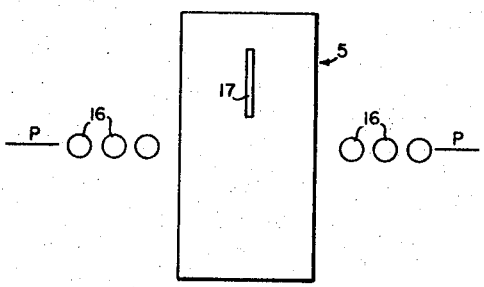
Figure 2C:
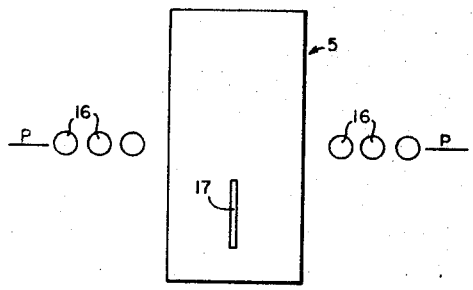
Figure 3:
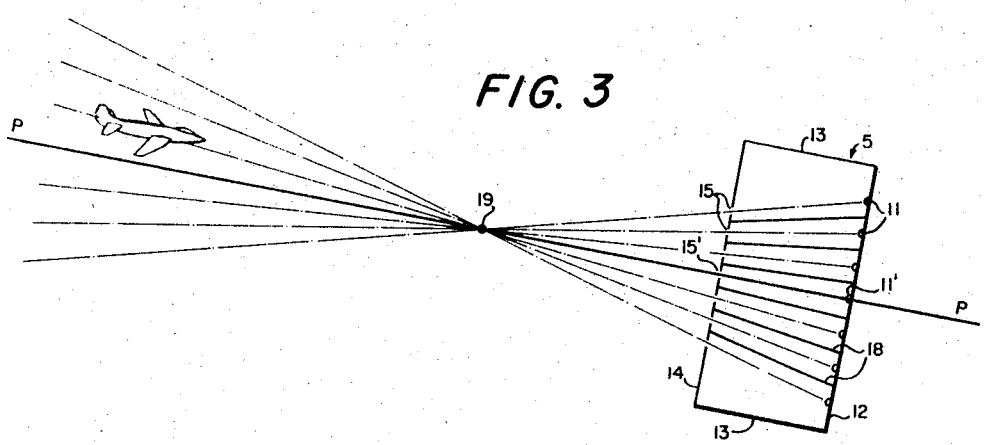
Figure 3A:
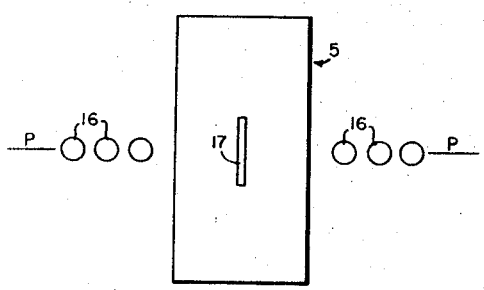
Figure 3B:
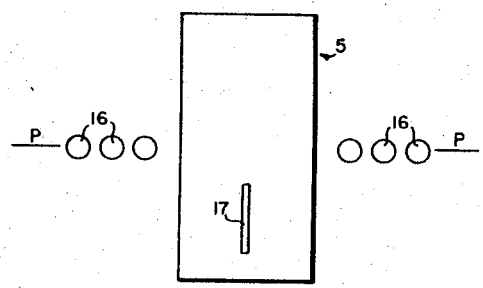
Figure 3C:
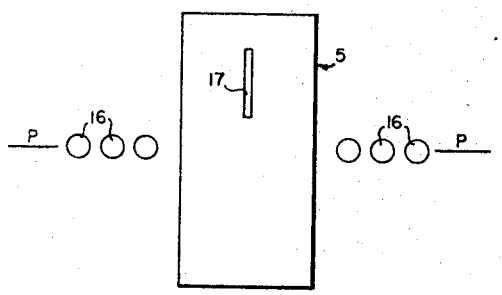

With these and other objects in view, as will hereinafter more fully appear, and which will be more particularly pointed out in the appended claims, reference is now made to the following description taken in connection with the acompanying drawings in which:

FIG. 1 shows a perspective view of the invention;
FIG. 2 illustrates a vertical sectional view of one embodiment of the invention;
FIGS. 2A, 2B and 2C show frontal elevations of the embodiment of the invention shown in FIG. 2, as seen by a pilot who is on the desired glide path, above it, or below it, respectively.
FIG. 3 is a vertical sectional view of a second embodiment of the invention;
FIGS. 3A, 3B and 3C illustrate frontal elevations of the second embodiment of the invention as shown in FIG. 3, as seen by a pilot who is on the desired glide path, above it, or below it, respectively.

Referring now to the drawings, wherein like reference characters designate like or corresponding parts throughout the several views there is shown in FIG. 1 the shadowbox 5, which may be about four feet in height, having an arrangement of equally spaced, thin-filament light sources 11 which are attached to bulb plate 12 and which are arranged so that the thin filaments of all of the light sources are parallel to each other. Spaced forward of the bulb plate by supports 13, and at about four feet from the bulb plate, is slot plate 14 having evenly spaced slots 15 located therein, which are oriented so as to be parallel to the thin filaments of the light sources, and which may be ⅛ to ¼ inch in height and spaced apart by about 2¼ inches, the spacing depending upon the optical characteristics desired.

Referring now to FIG. 2 there is shown the "forward" embodiment of this invention having an arrangement of equally-spaced, thin-filament light sources 11 attached to bulb plate 12 which is oriented perpendicularly to the desired glide path plane P. Spaced forward of the bulb plate 12 by supports 13 is slot plate 14 having slots 15 located therein. In the "forward" embodiment the center light source 11′ is located in the glide path plane P and the center slot 15′, corresponding to the light source 11′, is located in front of the light source 11′ and in the glide path plane P. Those slots 15 above and below the center 15′ are symmetrical and are evenly spaced from each other, but at a spacing which is greater than the distance between each of the light sources 11 so as to cause the light emanating from the slots to form diverging light beams. Spaced between each pair of corresponding slots and light sources are baffles 18, which may or may not be used.

In order to prevent pattern repetition, which occurs as a result of light from sources 11 and 11′ passing through more than just one slot, baffles 18 may be used in either the "forward" or "backward" units to permit light from each source 11 or 11′ to pass only through its corresponding slot 15 or 15′.

FIGS. 2A, 2B and 2C show the "forward" embodiment of this invention having a series of reference lights 16 oriented adjacent to the shadowbox 5 and in the glide path plane P, and a column of light 17, originating from light sources 11, indicating to the approaching pilot whether he is on the desired glide path, above it or below it, respectively.

With reference to FIG. 3 there is shown the "backward" embodiment of this invention having an arrangement of equally-spaced, thin-filament light sources 11 attached to bulb plate 12 which is oriented perpendicularly to the desired glide path plane P. Spaced forward of the bulb plate 12 by supports 13 is slot plate 14 having slots 15 located therein. In this "backward" embodiment the center light source 11′ is located in the glide path plane P and the center slot 15′, corresponding to the light source 11′, is located in front of the light source 11′ and in the glide path plane P. The focal point 19 is also located in the plane P. Those slots 15 above and below the center slot 15′ are symmetrical and are evenly spaced from each other, but at a spacing which is less than the distance between each of the light sources 11 so as to cause the light emanating from the slots to form converging beams. Spaced between each pair of corresponding slots and light sources are baffles 18, which may or may not be used.

FIGS. 3A, 3B and 3C show the "backward" embodiment of this invention having a series of reference lights 16 oriented in the glide path plane P and slot plate 14 with a column of light 17, originating from light sources 11, indicating to the approaching pilot whether he is on the desired glide path, above it or below it, respectively.

In the operation of the "forward" embodiment of the invention shown in FIGS. 2, and 2A–2C, a pilot approaching the device will see a thin vertical line of light 17 which is a composite of a plurality of beams radiated from shadowbox 5 and which will move vertically in the same direction as the pilot's aircraft moves vertically, relative to plane P, so as to be centered with respect to the reference lights 16 when the aircraft is vertically oriented in the desired glide path plane P as shown in FIG. 2A. When the aircraft is vertically oriented above the glide-path plane P the column of light 17 will appear to the pilot with its center portion above the reference lights 16, as shown in FIG. 2B, and when the aircraft is vertically oriented below the glidepath plane P the column of light 17 will appear to the pilot with its center portion below the reference lights 16, as shown in FIG. 2C. The pilot will see what appears to him to be a thin vertical line of light 17, but in reality he will be seeing light from more than one of the light sources 11 and 11′, which composite light will appear as a vertical line. By varying the height of the slots 15 and 15′ and the disstance between the slot plate 14 and the bulb plate 12, the number of light sources 11 and 11′ which can be seen simultaneously from any one position by the approaching pilot can be varied in order to provide what appears to be a shorter or longer vertical line of light 17. The orientation of each slot 15 with respect to its corresponding light source 11 determines the angle of a projected beam of light with respect to the glide path plane P. The width of the slots 15 and 15′ determines the angular width of the beam of projected light in the plane of the glide path P, and the vertical dimensions of each slot 15 and 15′ determines the angular height of each beam.

As the pilot approaches the "backward" embodiment of this invention as shown in FIGS. 3 and 3A–3C, he will also see a thin vertical line of light 17, but this line of light 17 will move vertically in a direction opposite from the vertical direction in which the pilot's aircraft moves, with reference to the glide path plane P, so as to be centered with respect to the reference lights 16 when the aircraft is vertically oriented in the desired glide path plane P, as shown by FIG. 3A. The "backward" embodiment has a cross-over point at the focal point 19 inside of which the "backward" unit functions in a manner similar to the operation of the "forward" unit. However, the distance of the cross-over point 19 from the unit can be determined from the geometry of the device and it is generally so close to the device, e.g. 150–300 feet, as not to affect the pilot in his approach, since within 300 feet the pilot is no longer depending upon the device, anyway.

By using both the "forward" and "backward" embodiments of this invention side by side it is possible to double the displacement between columns of light, thus making it easier for an approaching pilot to determine his deviation from the glide-path plane P. In addition, each of the embodiments could be modified by providing blinking lights and wider slots with colored filters at the top and bottom to show the pilot when he is approaching the outer limits of operation of the device.

In a modified form of this invention the device can alternatively be used to give, not only vertical information with respect to the desired glide path, but instead horizontal or lateral information with respect to the desired glide path. This can be accomplished by simply rotating together by 90° the shadowbox 5 and the reference lights 16. When used in conjunction with another device, which is vertically oriented, both horizontal and vertical deviations from the desired glide path can be detected.

It can be seen that this invention very effectively provides for a visual, position-indicating device which accurately displays glide path error information. By materially reducing the complexity of the device and the number of components with respect to similar prior art devices, the invention attains the same results at a much lower cost of construction and maintenance while suffering no adverse effects.

What is claimed and desired to be secured by Letters Patent of the United States is:

1. A visual position indicating device for providing an observer with a visual display of the observer's position with respect to a desired glide path plane in an approach to a landing on the ground or on the deck of an aircraft carrier comprising:

a series of thin filament light sources equally spaced from each other and symmetric with respect to said glide plane, said sources located in a plane transverse to said glide plane, each source having optical characteristics which are indistinguishable, by said observer, from the optical characteristics of the other sources, a plate spaced from and located in a plane parallel to said plane containing said sources, a series of equally spaced slots in said plate on both sides of said glide plane and symmetric therewith, the dimensions of said slots being such that said sources appear as a thin line of light to an observer within the operating range of the device, the distance between said slots being greater than the distance between said sources and said sources being located with respect to said slots such that lines drawn through the center of said slots and said sources form angles with respect to lines parallel to said glide path plane, said angles increasing symmetrically with increasing distance from said glide path plane, and reference light means located adjacent said plate to enable an observer to ascertain his position relative to said glide plane.

2. A visual position indicating device for providing an observer with a visual display of the observer's position with respect to a desired glide path plane in an approach to a landing on the ground or on the deck of an aircraft carrier comprising:

a series of thin filament light sources equally spaced from each other and symmetric with respect to said glide plane, said sources located in a plane transverse to said glide plane, each source having optical characteristics which are indistinguishable, by said observer, from the optical characteristics of the other sources, a plate spaced from and located in a plane parallel to said plane containing said sources, a series of equally spaced slots in said plate on both sides of said glide plane and symmetric therewith, the dimensions of said slots being such that said sources appear as a thin line of light to an observer within the operating range of the device, the distance between said slots is smaller than the distance between said sources, and said sources being located with respect to said slots such that lines drawn through the center of said slots and said sources form angles with respect to lines parallel to said glide path plane, said angle increasing symmetrically with increasing distance from said glide path plane, whereby said center lines meet at a point in front of said plate, and reference light means located adjacent said plate to enable an observer to ascertain his position relative to said glide plane.

3. The device of claim 2 further including a series of baffles to allow light from each light source to pass through only one slot.

References Cited
UNITED STATES PATENTS 2,968,023  1/1961  Ferguson et al. _____ 340—26
2,975,400  3/1961  Ferguson et al. _____ 340—26

ALVIN H. WARING, *Primary Examiner.*

U.S. Cl. X.R.

240—1.2